(12) United States Patent
Cheong et al.

(10) Patent No.: US 9,059,479 B2
(45) Date of Patent: Jun. 16, 2015

(54) RECHARGEABLE LITHIUM BATTERY

(75) Inventors: Kwang-Jo Cheong, Yongin-si (KR); Yong-Beom Lee, Yongin-si (KR); Hee-Sun Yun, Yongin-si (KR); Soo-Mi Eo, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 393 days.

(21) Appl. No.: 12/899,422

(22) Filed: Oct. 6, 2010

(65) Prior Publication Data

US 2011/0117441 A1     May 19, 2011

(30) Foreign Application Priority Data

Nov. 13, 2009 (KR) .......................... 10-2009-0109970

(51) Int. Cl.
*H01M 2/16* (2006.01)
*H01M 10/0562* (2010.01)
(Continued)

(52) U.S. Cl.
CPC ...... *H01M 10/0565* (2013.01); *H01M 10/0525* (2013.01); *H01M 2300/0082* (2013.01); *Y02E 60/122* (2013.01)

(58) Field of Classification Search
CPC ..................... H01M 10/0565; H01M 10/0525
USPC .......................... 429/249, 322, 231.8, 231.95
See application file for complete search history.

(56) References Cited

U.S. PATENT DOCUMENTS

| 7,223,501 | B2 | 5/2007 | Jung et al. | |
|---|---|---|---|---|
| 2003/0157407 | A1* | 8/2003 | Kosuzu et al. | ......... 429/231.95 |

(Continued)

FOREIGN PATENT DOCUMENTS

| CN | 1855604 A | 11/2006 |
|---|---|---|
| EP | 1 715 542 A1 | 10/2006 |

(Continued)

OTHER PUBLICATIONS

European Search Report dated Mar. 25, 2011, for corresponding European Patent application 10189872.4, noting listed references in this IDS.

(Continued)

*Primary Examiner* — Helen O Conley
(74) *Attorney, Agent, or Firm* — Christie, Parker & Hale LLP

(57) ABSTRACT

A rechargeable lithium battery includes a positive electrode including a positive active material being capable of intercalating or deintercalating lithium; a negative electrode including a carbon-based negative active material and a water-soluble binder; and a polymer electrolyte including a polymer, a non-aqueous organic solvent and a lithium salt, wherein the polymer comprises a polymerization product of a first monomer represented by Chemical Formula 1 with a second monomer which is one or more of monomers represented by Chemical Formulae 2 to 7:

| | |
|---|---|
| A-U—B | Chemical Formula 1 |
| $CH_2$=CL1-C(=O)—O-M | Chemical Formula 2 |
| $CH_2$=CL1-O-M | Chemical Formula 3 |
| $CH_2$=CL1-O—C(=O)-M | Chemical Formula 4 |
| $CH_2$=CH—$CH_2$—O-M | Chemical Formula 5 |
| $CH_2$=CH—S(=O)$_2$-M | Chemical Formula 6 |
| $CH_2$=CL1-C(=O)—O—$CH_2CH_2$—NH—C(=O)—O-M | Chemical Formula 7 | wherein, definition of each substituent group is as described in detailed description.

6 Claims, 1 Drawing Sheet

(51) Int. Cl.
*H01M 4/13* (2010.01)
*H01M 10/0565* (2010.01)
*H01M 10/0525* (2010.01)

(56) References Cited

U.S. PATENT DOCUMENTS

| | | |
|---|---|---|
| 2006/0003232 A1 | 1/2006 | Jung et al. |
| 2006/0240326 A1 | 10/2006 | Lee et al. |
| 2007/0009806 A1 | 1/2007 | Kim |
| 2007/0275302 A1 | 11/2007 | Sotowa et al. |

FOREIGN PATENT DOCUMENTS

| | | |
|---|---|---|
| JP | 2003-249264 A | 9/2003 |
| JP | 2006-302885 | 11/2006 |
| JP | 2007-042620 | 2/2007 |
| KR | 10-2004-0020633 | 3/2004 |
| KR | 10-2006-0001742 | 1/2006 |
| KR | 10-2006-0110635 | 10/2006 |
| KR | 10-2007-0014677 A | 2/2007 |
| KR | 10-0759377 B1 | 9/2007 |

OTHER PUBLICATIONS

KIPO Notice of Allowance dated Jan. 16, 2012 in Application No. 10-2009-0109970, 5 pages.

Japanese Office action dated Aug. 21, 2012 issued in corresponding Japanese Application No. 2010-110209, 3 pages.

KIPO Office action dated Jun. 1, 2011, for Korean priority Patent application 10-2009-0109970, noting listed references in this IDS, 5 pages.

SIPO Office action dated Mar. 8, 2013, for corresponding Chinese Patent application 201010541012.7, with English translation, (15 pages).

Mao, Zongwan, "Comprehensive Chemical Test," Since Press, Sep. 30, 2008. (4 pages).

SIPO Office Action dated Oct. 22, 2013 for corresponding Chinese Patent Application No. 201010541012.7, with English Translation (12 pages).

Xia, Yuanxun, "Chemical Toxicity Encyclopedia," Shanghai Science and Technology Literature Press, Jul. 31, 1991. (3 pages).

SIPO Decision of Rejection dated Feb. 18, 2014, with English translation, for corresponding Chinese Patent application 201010541012.7, (15 pages).

* cited by examiner

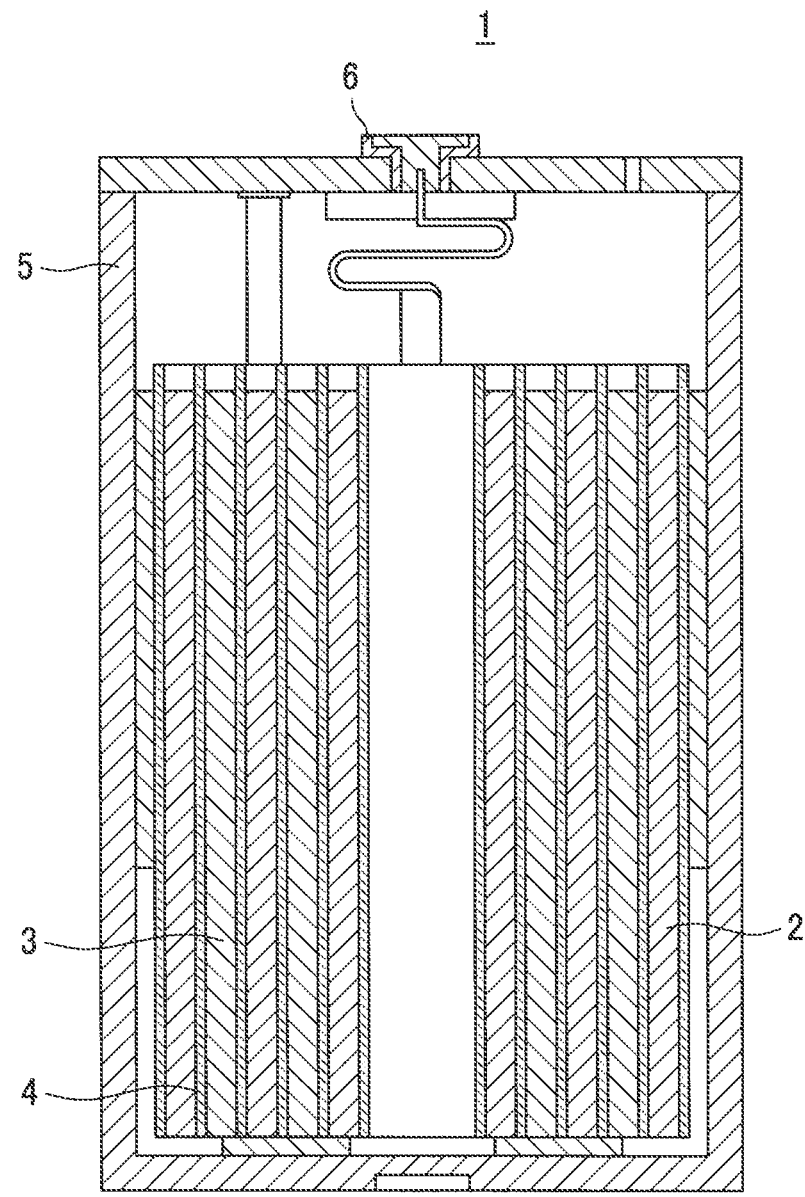

RECHARGEABLE LITHIUM BATTERY

CROSS-REFERENCE TO RELATED APPLICATIONS

This application claims priority to and the benefit of Korean Patent Application No. 10-2009-0109970, filed in the Korean Intellectual Property Office on Nov. 13, 2009, the entire content of which is incorporated herein by reference.

BACKGROUND

1. Field

This disclosure relates to a rechargeable lithium battery.

2. Description of the Related Art

Recently, due to reductions in the size and weight of portable electronic equipment, portable electronic equipment is increasingly being used. A battery having a high energy density for use as a power source of such portable electronic equipment is needed, and thus, research into a rechargeable lithium battery has been actively conducted. For a positive active material of a rechargeable lithium battery, a lithium-transition element oxide has been used. For a negative active material, a crystalline or amorphous carbon-based material or carbon composite has been used. To fabricate positive and negative electrodes, either the positive and negative active materials are coated on a current collector at an appropriate thickness, or the positive and negative active materials are made in the form of a film. To fabricate an electrode assembly, the positive and negative electrodes are then wound or stacked with an insulating separator interposed therebetween. The electrode assembly is put into a can or another case, and an electrolyte solution is injected to fabricate a prismatic rechargeable battery. Compared to using a can as a battery container, using a pouch as a battery container is advantageous in that the shape of the pouch may be flexibly changed and the size of the pouch may be increased. However, the pouch-type battery container is disadvantageous in that it may be easily deformed and damaged by external physical impact and it may be swollen when exposed to high temperatures. Such disadvantages become more serious in a rechargeable lithium battery using a liquid electrolyte solution than in a rechargeable lithium battery using a polymer electrolyte. Therefore, a pouch-type battery container is usually used with polymer electrolyte rechargeable lithium batteries. The polymer electrolyte rechargeable lithium battery has advantages such as not leaking, improved safety, improved high-temperature stability, and it may be more resistant to external physical impact. However, when the physical strength of the battery is increased in order to increase the resistance against external physical impact, the performance of the battery may be deteriorated due to an increase in internal resistance.

SUMMARY

In embodiments of the present invention, a rechargeable lithium battery may have increased resistance to external physical impact, may have increased capacity, and may have excellent battery performance.

According to an embodiment, a rechargeable lithium battery includes a positive electrode including a positive active material capable of intercalating and deintercalating lithium; a negative electrode including a carbon-based negative active material and a water-soluble binder; and a polymer electrolyte including a polymer, a non-aqueous organic solvent and a lithium salt. The polymer comprises the polymerization product of a first monomer represented by Chemical Formula 1 with a second monomer which includes one or more monomers represented by Chemical Formulae 2 to 7.

A-U—B            Chemical Formula 1

In Chemical Formula 1, A and B are the same or different, and are one of $CH_2=CR-C(=O)-$, $CH_2=CR-O-CH_2-$, $CH_2=CR-$, $CH_2=CR-O-C(=O)-$, $CH_2=CR-CH_2-$, $CH_2=CR-CH_2-O-$, $CH_2=CH-S(=O)_2-$, or $CH_2=CR-C(=O)-O-CH_2CH_2-NH-C(=O)-$, where R is H, a $C_1$ to $C_{10}$ hydrocarbon, or a $C_6$ to $C_{10}$ aromatic hydrocarbon.

$CH_2=CL1-C(=O)-O-M$      Chemical Formula 2

$CH_2=CL1-O-M$      Chemical Formula 3

$CH_2=CL1-O-C(=O)-M$      Chemical Formula 4

$CH_2=CH-CH_2-O-M$      Chemical Formula 5

$CH_2=CH-S(=O)_2-M$      Chemical Formula 6

$CH_2=CL1-C(=O)-O-CH_2CH_2-NH-C(=O)-O-M$      Chemical Formula 7

In Chemical Formulae 2 to 7, L1 is H, a $C_1$ to $C_{10}$ hydrocarbon, or a $C_6$ to $C_{10}$ aromatic hydrocarbon; M is a $C_1$ to $C_{20}$ hydrocarbon, a $C_1$ to $C_{20}$ halogenated hydrocarbon, a $C_6$ to $C_{20}$ aromatic hydrocarbon, or a $C_6$ to $C_{20}$ halogenated aromatic hydrocarbon.

In Chemical Formula 1, U may include at least one of a first repeating unit represented by Chemical Formula 8a, a second repeating unit represented by Chemical Formula 8b, and a third repeating unit represented by Chemical Formula 8c.

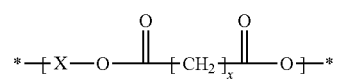

Chemical Formula 8a

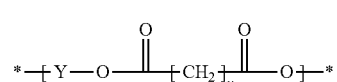

Chemical Formula 8b

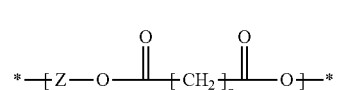

Chemical Formula 8c

In Chemical Formulae 8a-8c, X, Y and Z are the same or different, and X, Y and Z are moieties derived from ethyleneglycol, polyethylene glycol, propyleneglycol, polypropylene glycol, diethylene glycol, alkanediols, ethoxylated alkanediols, propoxylated alkanediols, trimethylolpropane, ethoxylated trimethylolpropane, propoxylated trimethylolpropane, ditrimethylolpropane, ethoxylated ditrimethylolpropane, propoxylated ditrimethylolpropane, pentaerythritol, ethoxylated pentaerythritol, propoxylated pentaerythritol, dipentaerythritol, ethoxylated dipentaerythritol, propoxylated dipentaerythritol, bisphenol A, ethoxylated bisphenol A, or propoxylated bisphenol A, and x, y and z are the same or different, and x, y and z are integers ranging from 1 to 20.

The carbon-based negative active material may be crystalline carbon. In one embodiment, the carbon-based negative active material may be natural graphite.

The weight ratio of the first monomer to the second monomer may range from about 85:15 to about 50:50. The weight ratio of the first monomer to the second monomer may range from about 75:25 to about 60:40.

The binder may be selected from the group consisting of styrene-butadiene rubber, acrylated styrene-butadiene rubber, polyacrylic acid sodium, a copolymer of propylene and a C2 to C8 olefin, a copolymer of (meth)acrylic acid and (meth)acrylic alkylester, and combinations thereof.

BRIEF DESCRIPTION OF THE DRAWING

The drawing is a schematic view of a rechargeable lithium battery according to one embodiment.

DETAILED DESCRIPTION

Hereinafter, exemplary embodiments of this disclosure will be described in more detail so that those skilled in the art are able to implement it. However, aspects of the present invention can be implemented in various ways and are not limited to the following exemplary embodiments.

According to one embodiment, a rechargeable lithium battery includes a positive electrode, a negative electrode, and a polymer electrolyte. The positive electrode includes a positive active material capable of intercalating and deintercalating lithium. The negative electrode includes a carbon-based negative active material and a water-soluble binder. The polymer electrolyte includes a polymer prepared by polymerizing a first monomer represented by Chemical Formula 1 with a second monomer which includes one or more monomers represented by Chemical Formulae 2 to 7.

The mixing ratio of the first monomer to the second monomer may range from a weight ratio of about 85:15 to a weight ratio of about 50:50. When the weight ratio of the first monomer to the second monomer falls in this range, the strength of battery may be improved. In one embodiment, the weight ratio may range from about 75:25 to about 60:40. When the weight ratio of the first monomer to the second monomer falls in this range, the strength of battery may be more improved.

A-U—B            Chemical Formula 1

In Chemical Formula 1, U is a moiety of polyesterpolyol, which is produced by a condensation reaction of at least one alcohol derivative including 2 to 6 terminal hydroxyl (OH) groups and at least one dicarboxylic acid derivative. U has a weight average molecular weight of about 100 to about 10,000,000, and A and B are the same or different, and are one of $CH_2=CR-C(=O)-$, $CH_2=CR-O-CH_2-$, $CH_2=CR-$, $CH_2=CR-O-C(=O)-$, $CH_2=CR-CH_2-$, $CH_2=CR-CH_2-O-$, $CH_2=CH-S(=O)_2-$, or $CH_2=CR-C(=O)-O-CH_2CH_2-NH-C(=O)-$, where R is H, a $C_1$ to $C_{10}$ hydrocarbon, or a $C_6$ to $C_{10}$ aromatic hydrocarbon. In one embodiment, A and B may be the same or different, and may be one of $CH_2=CR-C(=O)-$, $CH_2=CR-$, $CH_2=CR-CH_2-$, $CH_2=CH-S(=O)_2-$, or $CH_2=CR-C(=O)-O-CH_2CH_2-NH-C(=O)-$. In another embodiment A and B may be the same or different, and may be one of $CH_2=CR-C(=O)-$, $CH_2=CR-$, $CH_2=CH-S(=O)_2-$, or $CH_2=CR-C(=O)-O-CH_2CH_2-NH-C(=O)-$.

$CH_2=CL1-C(=O)-O-M$      Chemical Formula 2

$CH_2=CL1-O-M$      Chemical Formula 3

$CH_2=CL1-O-C(=O)-M$      Chemical Formula 4

$CH_2=CH-CH_2-O-M$      Chemical Formula 5

$CH_2=CH-S(=O)_2-M$      Chemical Formula 6

$CH_2=CL1-C(=O)-O-CH_2CH_2-NH-C(=O)-O-M$      Chemical Formula 7

In Chemical Formulae 2 to 7, L1 is H, a $C_1$ to $C_{10}$ hydrocarbon, or a $C_6$ to $C_{10}$ aromatic hydrocarbon, M is a $C_1$ to $C_{20}$ hydrocarbon, a $C_1$ to $C_{20}$ halogenated hydrocarbon, a $C_6$ to $C_{20}$ aromatic hydrocarbon, or a $C_6$ to $C_{20}$ halogenated aromatic hydrocarbon.

In one embodiment the second monomer may be the compound represented by Chemical Formula 2.

The alcohol derivative for preparing the polyesterpolyol may be ethyleneglycol, polyethyleneglycol, propyleneglycol, polypropyleneglycol, alkane diols, ethoxylated alkane diols, propoxylated alkanediols, trimethylolpropane, ethoxylated trimethylolpropane, propoxylated trimethylolpropane, ditrimethylolpropane, ethoxylated ditrimethylolpropane, propoxylated ditrimethylolpropane, pentaerythritol, ethoxylated pentaerythritol, propoxylated pentaerythritol, dipentaerythritol, ethoxylated dipentaerythritol, propoxylated dipentaerythritol, bisphenol A, ethoxylated bisphenol A, or propoxylated bisphenol A.

The dicarboxylic acid derivative may be succinic acid, glutaric acid, adipic acid, suberic acid, azelaic acid, sebacic acid, decane dicarboxylic acid, maleic acid, fumaric acid, phthalic acid, isophthalic acid, or terephthalic acid.

Non-limiting examples of the first monomer represented by Chemical Formula 1 include a monomer including at least one of a first repeating unit represented by Chemical Formula 8a, a second repeating unit represented by Chemical Formula 8b, or a third repeating unit represented by Chemical Formula 8c, and having both terminal A and B groups (e.g., where A and B are the same as described above). When at least two of the first repeating unit, the second repeating unit, the third repeating unit, or combinations thereof are included, the repeating units may be regularly arrayed or randomly arrayed,

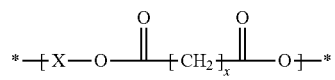

Chemical Formula 8a

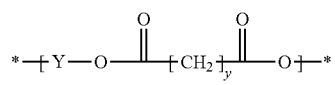

Chemical Formula 8b

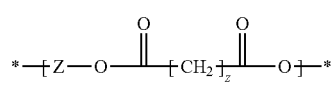

Chemical Formula 8c

In Chemical Formulae 8a-8c, X, Y, and Z are the same or different, and X, Y, and Z are moieties of an alcohol derivative used for preparation of polyesterpolyol. Examples of the alcohol derivative include ethyleneglycol, polyethylene glycol, propyleneglycol, polypropylene glycol, diethylene glycol, alkane diols, ethoxylated alkane diols, propoxylated alkanediols, trimethylolpropane, ethoxylated trimethylolpropane, propoxylated trimethylolpropane, ditrimethylolpropane, ethoxylated ditrimethylolpropane, propoxylated ditrimethylolpropane, pentaerythritol, ethoxylated pentaerythritol, propoxylated pentaerythritol, dipentaerythritol, ethoxylated dipentaerythritol, propoxylated dipentaerythritol, bisphenol A, ethoxylated bisphenol A, and propoxylated bisphenol A. In Chemical Formulae 8a-8c, x, y, and z are the same or different and are integers ranging from 1 to 20.

When the mole numbers of the first repeating unit, the second repeating unit, and the third repeating unit are l, m, and n, respectively, each of l, m, and n may have a value of 0 or may be equal to or greater than 1. At least one of l, m, and n should be equal to or greater than 1. Also, l, m, and n may be appropriately adjusted based on a target molecular weight of a first monomer, and each of the l, m and n values may range from 1 to 35 in consideration of the target number average molecular weight of the first monomer, which ranges from about 6,000 to about 8,000, and the weight average molecular weight of the first monomer, which ranges from about 16,000 to about 19,000.

The polymer electrolyte also includes a non-aqueous organic solvent and a lithium salt, like those generally used in a liquid electrolyte solution.

The lithium salt supplies lithium ions in the battery and improves lithium ion transport between positive and negative electrodes. Non-limiting examples of the lithium salt include at least one supporting electrolyte salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$, (where x and y are natural numbers), LiCl, LiI, and $LiB(C_2O_4)_2$ (lithium bisoxalate borate, or LiBOB). The lithium salt may be used at a 0.1 to 2.0M concentration. When the lithium salt is included within the above concentration range, electrolyte performance and lithium ion mobility may be enhanced due to optimal electrolyte conductivity and viscosity.

The non-aqueous organic solvent may include a carbonate-based, ester-based, ether-based, ketone-based, alcohol-based, or aprotic solvent. Examples of the carbonate-based solvent include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. Examples of the ester-based solvent include methyl acetate, ethyl acetate, n-propyl acetate, dimethylacetate, methylpropionate, ethylpropionate, γ-butyrolactone, decanolide, valerolactone, mevalonolactone, caprolactone, and the like. Examples of the ether-based solvent include dibutyl ether, tetraglyme, diglyme, dimethoxyethane, 2-methyltetrahydrofuran, tetrahydrofuran, and the like. Examples of the ketone-based solvent include cyclohexanone and the like. Examples of the alcohol-based solvent include ethyl alcohol, isopropyl alcohol, and the like. Examples of the aprotic solvent include nitriles such as R—CN (wherein R is a C2 to C20 linear, branched, or cyclic hydrocarbon, a double bond, an aromatic ring, or an ether bond), amides such as dimethylformamide, dioxolanes such as 1,3-dioxolane, sulfolanes, and the like.

One non-aqueous organic solvent may be used, or combinations of organic solvents may be used. When combinations of organic solvents are used, the mixture ratio may be controlled in accordance with a desirable battery performance.

The carbonate-based solvent may include a mixture of a cyclic carbonate and a linear carbonate. The cyclic carbonate and the linear carbonate are mixed together at the volume ratio of about 1:1 to about 1:9. When the cyclic carbonate and linear carbonate mixture is included in the electrolyte, electrolyte performance may be enhanced.

In addition, the electrolyte of this disclosure may further include mixtures of carbonate-based solvents and aromatic hydrocarbon-based solvents. The carbonate-based solvents and the aromatic hydrocarbon-based solvents may be mixed together at a volume ratio of about 1:1 to about 30:1.

The aromatic hydrocarbon-based organic solvent may be represented by Chemical Formula 9.

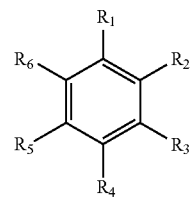

Chemical Formula 9

In Chemical Formula 9, $R_1$ to $R_6$ are independently selected from hydrogen, a halogen, a C1 to C10 alkyl, a C1 to C10 haloalkyl, or combinations thereof.

The aromatic hydrocarbon-based organic solvent may include, but is not limited to, benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and combinations thereof.

The non-aqueous electrolyte may further include vinylene carbonate or an ethylene carbonate-based compound represented by Chemical Formula 10 in order to improve cycle-life of a battery.

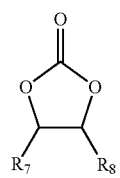

Chemical Formula 10

In Chemical Formula 10, $R_7$ and $R_8$ are the same or different and are selected from hydrogen, a halogen, a cyano (CN), a nitro ($NO_2$), and a C1 to C5 fluoroalkyl, provided that at least one of $R_7$ and $R_8$ is a halogen, a cyano (CN), a nitro ($NO_2$), or a C1 to C5 fluoroalkyl (and thus, that $R_7$ and $R_8$ are not simultaneously hydrogen).

The ethylene carbonate-based compound may be difluoroethylene carbonate, chloroethylene carbonate, dichloroethylene carbonate, bromoethylene carbonate, dibromoethylene carbonate, nitroethylene carbonate, cyanoethylene carbonate, fluoroethylene carbonate, or mixtures thereof. The amount of the vinylene carbonate or ethylene carbonated based additive for improving cycle life may be adjusted within an appropriate range.

The polymer electrolyte according to one embodiment is prepared by polymerizing the first monomer with the second monomer. Herein, a polymerization reaction may be implemented using a polymerization initiator. In other words, a polymer electrolyte composition including the first monomer, the second monomer, the polymerization initiator, a non-aqueous organic solvent, and a lithium salt is polymerized to thereby prepare a polymer electrolyte according to one embodiment.

As for the polymerization initiator, any material that initiates polymerization of monomers, while not deteriorating the battery performance, may be used. Non-limiting examples of the polymerization initiator include an organic peroxide, an azo-based compound, and combinations thereof.

Examples of the organic peroxide include peroxy dicarbonates such as di(4-t-butylcyclohexyl)peroxydicarbonate, di-2-ethylhexyl peroxy dicarbonate, di-isopropyl peroxy dicarbonate, di-3-methoxy butyl peroxy dicarbonate, t-butyl peroxy isopropyl carbonate, t-butyl peroxy 2-ethylhexyl carbonate, 1,6-bis(t-butyl peroxycarbonyloxy)hexane, diethylene glycol-bis(t-butyl peroxy carbonate), and the like; diacyl peroxides such as diacetyl peroxide, dibenzoyl peroxide, dilauroyl peroxide, bis-3,5,5-trimethyl hexanoyl peroxide, and the like; peroxy esters such as perhexyl pivalate, t-butyl peroxypivalate, t-amyl peroxypivalate, t-butyl peroxy-2-ethyl-hexanoate, t-hexylperoxy pivalate, t-butyl peroxy neodecanoate, t-butyl peroxy neoheptanoate, t-hexylperoxy pivalate, 1,1,3,3-tetramethylbutyl peroxy neodecarbonate, 1,1,3,3-tetramethyl butyl 2-ethylhexanoate, t-amyl peroxy 2-ethyl hexanoate, t-butyl peroxy isobutyrate, t-amylperoxy 3,5,5-trimethyl hexanoate, t-butyl peroxy 3,5,5-trimethyl hexanoate, t-butyl peroxy acetate, t-butyl peroxy benzoate, di-butylperoxy trimethyl adipate, and the like. Examples of the azo-based compound include 2,2'-azo-bis(isobutyronitrile), 2,2'-azo-bis(2,4-dimethylvaleronitrile), or 1,1'-azo-bis(cyanocyclo-hexane).

The amount of the polymerization initiator in the polymerization reaction is an amount that causes the polymerization reaction of the monomers. Generally, the amount of the polymerization initiator ranges from about 50 to about 1000 ppm based on the total weight of the first monomer, the second monomer, the lithium salt, and the non-aqueous organic solvent. In some embodiments, the amount of the polymerization initiator may range from about 200 to about 400 ppm based on the total weight of the first monomer, the second monomer, the lithium salt, and the non-aqueous organic solvent. When the amount of the polymerization initiator is included in the range of about 50 to about 1000 ppm, the polymerization initiator does not remain as a byproduct in the prepared polymer electrolyte, and thus does not cause a sub-reaction such as generation of gas. For instance, when the polymerization initiator is a peroxide-based compound, when excess polymerization initiator is left after polymerization, $CO_2$ gas may be generated. Or when the polymerization initiator is an azo-based compound, when excess polymerization initiator is left after polymerization, $N_2$ gas may be generated. Also, when the polymer is within the range of about 50 to about 1000 ppm, the polymer has an appropriate degree of polymerization.

A rechargeable lithium battery using the polymer electrolyte composition is fabricated by inserting an electrode assembly, fabricated through a typical process to include a positive electrode, a separator, and a negative electrode, into a battery case. Then, a polymer electrolyte composition is injected into the battery case, and the polymer electrolyte composition is cured in the battery case. As the curing process is well known in the art, further description will not be provided herein. The polymerization reaction between the first monomer and the second monomer is initiated by the polymerization initiator included in the polymer electrolyte composition in the curing process, thereby forming a polymer.

Thus, the final battery includes an electrolyte existing in the form of a polymer. The battery case may be a metal can or a metal-laminated pouch.

The negative electrode of the rechargeable lithium battery according to one embodiment includes a carbon-based negative active material. Non-limiting examples of the carbon-based negative active material include crystalline carbon. In one embodiment, the carbon-based negative active material may be natural graphite. When natural graphite is used as the negative active material, it is relatively economical and battery capacity may be improved.

The negative electrode includes a water-soluble binder such as a styrene-butadiene rubber, an acrylated styrene-butadiene rubber, sodium polyacrylate, a copolymer of propylene and C2 to C8 olefin, a copolymer of (meth)acrylic acid and (meth)acrylic alkylester, or combinations thereof. When the water-soluble binder is used as a binder instead of a non-water soluble binder such as polyvinylidene fluoride, battery capacity may be improved.

The negative electrode may further include a cellulose-based compound to provide viscosity to the negative active material slurry. The cellulose-based compound includes one or more of carboxylmethyl cellulose, hydroxypropylmethyl cellulose, methyl cellulose, or alkali metal salts thereof. The alkali metal may be Na, K, or Li. The cellulose-based compound may be included in an amount of 0.1 to 3 parts by weight based on 100 parts by weight of the binder.

When the water-soluble binder is used as a binder of the negative electrode and natural graphite is used as a negative active material, the strength of the battery is improved so that the battery is more than twice as strong as the strength of a battery using a non-water-soluble binder such as polyvinylidene fluoride and an artificial graphite negative active material, both of which have been widely used.

The negative electrode may further include a conductive material in order to improve conductivity. For the conductive material, any electro-conductive material that does not cause a chemical reaction may be used. Non-limiting examples of the conductive material include a carbon-based material, e.g., natural graphite, artificial graphite, carbon black, acetylene black, ketjen black, and carbon fiber; a metal-based material, e.g., metal powder or metal fiber including metals such as nickel, copper, aluminum, or silver; a conductive polymer, e.g., a polyphenylene derivative; and combinations thereof.

The negative electrode includes a current collector, and the current collector includes a copper foil, a nickel foil, a stainless steel foil, a titanium foil, a nickel foam, a copper foam, a polymer substrate coated with a conductive metal, or combinations thereof.

The positive electrode includes a current collector and a positive active material located, as a layer, on the current collector. The positive active material includes compounds capable of reversibly intercalating and deintercalating lithium ions. The positive active material may include a composite oxide including lithium, and at least one of cobalt, manganese, nickel, or combinations thereof. In particular, the following lithium-containing compounds may be used: $Li_aA_{1-b}X_bD_2$ ($0.90 \leq a \leq 1.8$, $0 \leq b \leq 0.5$); $Li_aA_{1-b}X_bO_{2-c}D_c$ ($0.90 \leq a \leq 1.8$, $0 \leq b \leq 0.5$, $0 \leq c \leq 0.05$); $LiE_{2-b}X_bO_{4-c}D_c$ ($0 \leq b \leq 0.5$, $0 \leq c \leq 0.05$); $Li_aNi_{1-b-c}Co_bX_cD_\alpha$ ($0.90 \leq a \leq 1.8$, $0 \leq b \leq 0.5$, $0 \leq c \leq 0.05$, $0 < \alpha \leq 2$); $Li_aNi_{1-b-c}Co_bX_cO_{2-\alpha}T_\alpha$ ($0.90 \leq a \leq 1.8$, $0 \leq b \leq 0.5$, $0 \leq c \leq 0.05$, $0 < \alpha < 2$); $Li_aNi_{1-b-c}Co_bX_cO_{2-\alpha}T_2$ ($0.90 \leq a \leq 1.8$, $0 \leq b \leq 0.5$, $0 \leq c \leq 0.05$, $0 < \alpha < 2$); $Li_aNi_{1-b-c}Mn_bX_cD_\alpha$ ($0.90 \leq a \leq 1.8$, $0 \leq b \leq 0.5$, $0 \leq c \leq 0.05$, $0 < \alpha \leq 2$); $Li_aNi_{1-b-c}Mn_bX_cO_{2-\alpha}T_\alpha$ ($0.90 \leq a \leq 1.8$, $0 \leq b \leq 0.5$, $0 \leq c \leq 0.05$, $0 < \alpha < 2$); $Li_aNi_{1-b-c}Mn_bX_cO_{2-\alpha}T_2$ ($0.90 \leq a \leq 1.8$, $0 \leq b \leq 0.5$, $0 \leq c \leq 0.05$, $0 < \alpha < 2$); $Li_aNi_bE_cG_dO_2$ ($0.90 \leq a \leq 1.8$, $0 \leq b \leq 0.9$, $0 \leq c \leq 0.5$, $0.001 \leq d \leq 0.1$); $Li_aNi_bCo_cMn_dG_eO_2$ ($0.90 \leq a \leq 1.8$, $0 \leq b \leq 0.9$, $0 \leq c \leq 0.5$, $0 \leq d \leq 0.5$, $0.001 \leq e \leq 0.1$); $Li_aNiG_bO_2$ ($0.90 \leq a \leq 1.8$, $0.001 \leq b \leq 0.1$); $Li_aCoG_bO_2$ ($0.90 \leq a \leq 1.8$, $0.001 \leq b \leq 0.1$); $Li_aMnG_bO_2$ ($0.90 \leq a \leq 1.8$, $0.001 \leq b \leq 0.1$); $Li_aMn_2G_bO_4$ ($0.90 \leq a \leq 1.8$, $0.001 \leq b \leq 0.1$); $Li_fMn_{1-g}X_gPO_4$ ($0.9 \leq f \leq 1.8$, $0 \leq g \leq 0.5$); $QO_2$; $QS_2$; $LiQS_2$; $V_2O_5$; $LiV_2O_5$; $LiZO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In the above lithium containing compounds, A is Ni, Co, Mn, or combinations thereof; X is Al, Ni, Co, Mn, Cr, Fe, Mg, Sr, V, a rare earth element, or combinations thereof; D is O, F, S, P, or combinations thereof; E is Co, Mn, or combinations thereof; T is F, S, P, or combinations thereof; G is Al, Cr, Mn, Fe, Mg, La, Ce, Sr, V, or combinations thereof; Q is Ti, Mo, Mn, or combinations thereof; Z is Cr, V, Fe, Sc, Y, or combinations thereof; and J is V, Cr, Mn, Co, Ni, Cu, or combinations thereof.

The lithium containing compound may have a coating layer on its surface, or may be mixed with another compound which forms a coating layer. The coating layer may include at least one coating element compound selected from an oxide of a coating element, a hydroxide, an oxyhydroxide of a coating element, an oxycarbonate of a coating element, or a hydroxyl carbonate of a coating element. The compound for a coating layer may be amorphous or crystalline. The coating element for a coating layer may include Mg, Al, Co, K, Na, Ca, Si, Ti, V, Sn, Ge, Ga, B, As, Zr, or combinations thereof. The coating layer may be formed in a method having no adverse influence on properties of the positive active material as a result of including these elements in the compound. For example, the method may include any coating method such as spray coating, dipping, and the like. Such methods are well-known to those who work in the related field.

The positive active material layer also includes a binder and a conductive material.

The binder improves binding of the positive active material particles to one another, and also to the current collector. Examples of the binder include polyvinyl alcohol, carboxylmethyl cellulose, hydroxypropyl cellulose, diacetyl cellulose, polyvinylchloride, carboxylated polyvinyl chloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but any other suitable binders may be used.

The conductive material is included to improve electrode conductivity. Any electrically conductive material may be used as a conductive material unless it causes a chemical reaction. Examples of the conductive material include one or more of natural graphite, artificial graphite, carbon black, acetylene black, ketjen black, carbon fiber, a metal powder or a metal fiber including copper, nickel, aluminum, silver, or the like; a polyphenylene derivative; or combinations thereof.

The current collector may be Al, but other suitable current collectors may be used.

The negative and positive electrodes may be fabricated by a method including mixing the active material, a conductive material, and a binder into an active material composition and coating the composition on a current collector. The electrode manufacturing method is well known, and thus is not described in detail in the present specification.

Solvent is generally used to apply the active material, the conductive material, and the binder of the negative and positive electrodes. Nonlimiting examples of the solvent include N-methylpyrrolidone. Also, as the negative electrode uses a water-soluble binder, water may be used as the solvent.

A rechargeable lithium battery having the above-described structure in accordance with one embodiment may have diverse shapes and forms, for example, a cylindrical shape, a polygonal shape, or a pouch form (a laminated form). The drawing shows an example of the rechargeable lithium battery. As shown in the drawing, a lithium ion battery 1 includes a negative electrode 2, a positive electrode 3, a separator 4 disposed between the negative electrode 2 and the positive electrode 3, an electrolyte solution impregnating the negative electrode 2, the positive electrode 3, and the separator 4, a battery case 5, and a sealing member 6.

The following examples illustrate this disclosure in more detail. The following are mere examples of this disclosure and are not intended to limit the spirit and scope of this disclosure.

Comparative Example 1

5 wt % of a monomer mixture is mixed with 95 wt % of a mixed solution. The mixed solution includes 1.3M $LiPF_6$ dissolved in a mixed solvent of ethylene carbonate (EC), ethylmethyl carbonate (EMC), and diethyl carbonate (DEC) at a volume ratio of 30:20:50. The monomer mixture includes a first monomer, whose weight average molecular weight is about 18000, and a second monomer represented by Chemical Formula 2a, e.g., hexylacrylate, at a weight ratio of about 75:25. The first monomer includes a first repeating unit represented by Chemical Formula 8a, a second repeating unit represented by Chemical Formula 8b, and a third repeating unit represented by Chemical Formula 8c. The first monomer also has A and B terminal groups, where A is $CH_2=C(CH_3)-C(=O)-O-CH_2CH_2-NH-C(=O)-$ and B is $CH_2=C(CH_3)-C(=O)-O-CH_2CH_2-NH-C(=O)-$.

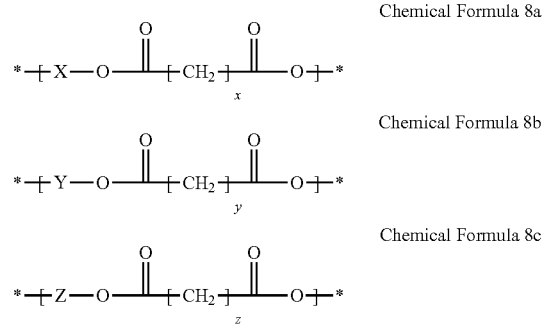

Chemical Formula 8a

Chemical Formula 8b

Chemical Formula 8c

In Chemical Formulae 8a, 8b, and 8c, X, Y, and Z are moieties derived from ethylene glycol, diethylene glycol, and trimethylolpropane, respectively.

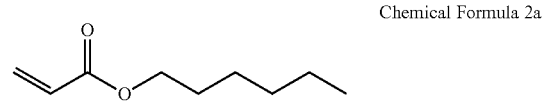

Chemical Formula 2a 2,2'-azobis(isobutyronitrile), an azo-based polymerization initiator, is added to the obtained solution (the combination of the monomer mixture and the mixed solution, referred to as a "pre-gel") at 350 ppm based on the weight of pre-gel, to prepare a polymer electrolyte composition.

The positive electrode is fabricated through a typical process by mixing $LiCoO_2$ positive active material, an acetylene black conductive material, and a polyvinylidene fluoride binder at a weight ratio of about 96:2:2 in N-methylpyrrolidone solvent to thereby prepare a positive active material slurry. The positive active material slurry is then applied to an aluminum foil current collector, and the current collector coated with the positive active material slurry is then pressed.

The negative electrode is fabricated through a typical process by mixing artificial graphite and a polyvinylidene fluoride binder at a weight ratio of about 94:6 in N-methylpyrrolidone solvent to thereby prepare a negative active material slurry. The negative active material slurry is then applied to a copper foil current collector, and the current collector coated with the negative active material slurry is then pressed.

2.7 g of the polymer electrolyte composition is injected into a battery assembly including a positive electrode, a negative electrode and a separator, and aged for about 16 hours. The acquired product is vacuum sealed and baked in an oven at about 75° C. for about 4 hours to thereby fabricate a laminated rechargeable lithium battery cell. The rechargeable lithium battery cell has a 1C nominal capacity (which is a capacity during a capacity assessment test) of about 900 mAh.

During the heating process, a polymerization reaction occurs, and a polymer electrolyte is formed inside the rechargeable lithium battery cell.

Comparative Example 2

A rechargeable lithium battery cell is fabricated according to the same method as in Comparative Example 1, except that 7 wt % of a monomer mixture, including the first monomer and the second monomer at a weight ratio of about 75:25, is mixed with 93 wt % of a mixed solution of 1.3M $LiPF_6$ dissolved in a mixed solvent of ethylene carbonate (EC), ethylmethyl carbonate (EMC) and diethyl carbonate (DEC) at a volume ratio of about 30:20:50.

Example 1

A rechargeable lithium battery cell is fabricated according to the same method as in Comparative Example 2, except that a negative electrode is fabricated using natural graphite, styrene butadiene binder, and carboxylmethyl cellulose thickener. Herein, the weight ratio of the natural graphite and the styrene butadiene binder is about 97:3, and carboxylmethyl cellulose is included at 1 part by weight based on 100 parts by weight of the styrene butadiene binder.

Example 2

7 wt % of the monomer mixture used in Example 1, which includes the first monomer and the second monomer at a weight ratio of about 75:25, is mixed with 93 wt % of a mixed solution of 1.3M $LiPF_6$ dissolved in a mixed solvent of ethylene carbonate (EC), ethylmethyl carbonate (EMC) and diethyl carbonate (DEC) at a volume ratio of about 30:20:50.

2,2'-azobis(isobutyronitrile) azo-based polymerization initiator is added to the obtained solution (the combination of the monomer mixture and the mixed solution, referred to as a "pre-gel") at 350 ppm based on the weight of the pre-gel, to prepare a polymer electrolyte composition.

The positive electrode is fabricated through a typical process by mixing $LiCoO_2$ positive active material, an acetylene black conductive material, and a polyvinylidene fluoride binder at a weight ratio of about 96:2:2 in N-methylpyrrolidone solvent to thereby prepare a positive active material slurry. The positive active material slurry is then applied to an aluminum foil current collector, and the current collector coated with the positive active material slurry is then pressed.

The negative electrode is fabricated through a typical process by mixing natural graphite, styrene butadiene rubber binder, and carboxylmethyl cellulose thickener in water solvent to thereby prepare a negative active material slurry. The negative active material slurry is then applied to a copper foil current collector, and the current collector coated with the negative active material slurry is then pressed. The weight ratio of the natural graphite and styrene butadiene rubber binder is about 97:3, and carboxylmethyl cellulose thickener is included at 1 parts by weight based on 100 parts by weight of the styrene butadiene rubber binder.

3.8 g of the polymer electrolyte composition is injected into a battery assembly including a positive electrode, a negative electrode and a separator, and aging is performed for about 16 hours. The acquired product is vacuum sealed and baked in an oven at about 75° C. for about 4 hours to thereby fabricate a laminated rechargeable lithium battery cell. The 1C nominal capacity of the rechargeable lithium battery cell is about 1200 mAh.

A polymerization reaction occurs in the baking process to thereby fabricate a polymer electrolyte inside the rechargeable lithium battery cell.

Example 3

A rechargeable lithium battery cell is fabricated according to the same method as in Example 2, except that a monomer mixture including the first monomer and the second monomer at a weight ratio of about 71:29 is used.

Example 4

A rechargeable lithium battery cell is fabricated according to the same method as in Example 2, except that a monomer mixture including the first monomer and the second monomer at a weight ratio of about 68:32 is used.

Example 5

A rechargeable lithium battery cell is fabricated according to the same method as in Example 2, except that a monomer mixture including the first monomer and the second monomer at a weight ratio of about 64:36 is used.

Example 6

A rechargeable lithium battery cell is fabricated according to the same method as in Example 2, except that a monomer mixture including the first monomer and the second monomer at a weight ratio of about 61:39 is used.

Example 7

A rechargeable lithium battery cell is fabricated according to the same method as in Example 2, except that a monomer mixture including the first monomer and the second monomer at a weight ratio of about 57:43 is used.

Example 8

A rechargeable lithium battery cell is fabricated according to the same method as in Example 2, except that a monomer mixture including the first monomer and the second monomer at a weight ratio of about 54:46 is used.

Example 9

A rechargeable lithium battery cell is fabricated according to the same method as in Example 2, except that a monomer mixture including the first monomer and the second monomer at a weight ratio of about 50:50 is used.

Comparative Example 3

A rechargeable lithium battery cell is fabricated according to the same method as in Example 2, except that polyethyleneglycol dimethacrylate is used as the first monomer.

Comparative Example 4

A rechargeable lithium battery cell is fabricated according to the same method as in Example 2, except that acrylic acid 3-acetoxy-propyl ester represented by Chemical Formula 11 is used as the second monomer.

Chemical Formula 11

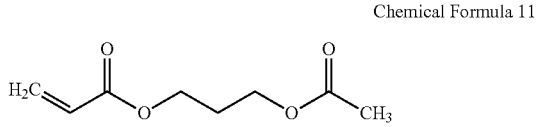

Comparative Example 5

A rechargeable lithium battery cell is fabricated according to the same method as in Example 2, except that a polymer electrolyte composition is prepared using polyethyleneglycol dimethacrylate instead of the monomer mixture. The monomer is then polymerized according to the method of Example 2.

The physical properties of the lithium battery cells fabricated according to Examples 1 to 9 and Comparative Examples 1 to 5 were measured as follows.

Strength Evaluation (at Room Temperature)

A battery cell is charged at a charge rate of 0.2C to a cut-off of 4.2V and 20 mAh. The cell is then discharged to a cut-off of 2.75V at a discharge rate of 0.2C. Next, the battery cell is constant current charged at a rate of 1C/36 minutes. The battery cell is then evaluated based on 3 point bending mode with a UTM (Universal Test Machine, manufactured by Instron). The strength of the battery cell is evaluated by measuring a maximum load (N) applied when the battery cell is bent 3 mm in a longitudinal direction at a speed of 5 mm/min. The span length, which is a distance between cradles for holding a battery cell, is obtained by subtracting 6 mm from the width of the battery cell.

Capacity Evaluation

A battery cell is charged/discharged three times, once for each of the following charge/discharge cycles. After the discharge of the third charge/discharge cycle, a battery discharge capacity is measured.

1) A battery cell is charged at a charge rate of 0.2C to a cut-off of 4.2V and 20 mA. The cell is then discharged to a cut-off of 2.75V at a discharge rate of 0.2C.

2) A battery cell is charged at a charge rate of 0.5C to a cut-off of 4.2V and 20 mA. The cell is then discharged to a cut-off of 2.75V at a discharge rate of 0.2C.

3) A battery cell is charged at a charge rate of 0.5C to a cut-off of 4.2V and 0.1C. The cell is then discharged to a cut-off of 3V at a discharge rate of 0.5C.

The strength of the battery and battery discharge capacities measured in the above-described methods are shown in Table 1.

TABLE 1

|  | Strength of Battery (N) | Battery Discharge Capacity (mAh) |
|---|---|---|
| Comparative Example 1 | 80 | 971 |
| Comparative Example 2 | 109 | 955 |
| Comparative Example 3 | 111 | 1146 |
| Comparative Example 4 | 118 | 1138 |
| Comparative Example 5 | 107 | 1216 |
| Example 1 | 203 | 977 |
| Example 2 | 221 | 1249 |
| Example 3 | 229 | 1251 |
| Example 4 | 244 | 1256 |
| Example 5 | 236 | 1254 |
| Example 6 | 196 | 1243 |
| Example 7 | 184 | 1240 |
| Example 8 | 173 | 1225 |
| Example 9 | 158 | 1218 |

As shown in Table 1, the battery cell of Example 1, fabricated by using natural graphite and styrene butadiene rubber binder for the negative electrode, has a battery strength that is more than twice as strong as the battery strength of the cells of Comparative Examples 1 and 2, fabricated by using artificial graphite and polyvinylidene fluoride binder. Also, the battery cell of Example 2, fabricated by using natural graphite and styrene butadiene rubber binder for the negative electrode, has both improved battery strength and capacity.

Also, although natural graphite is used as the negative active material and styrene butadiene rubber as the binder, the battery cells of Comparative Examples 3 and 4, having a different first or second monomer in the electrolyte, have substantially lower battery strength and capacity when compared to the battery cells of Examples 1 to 9. In addition, while the battery cell of Comparative Example 5, using a substantially different kind of polymer electrolyte, has a similar or slightly higher capacity than the battery cells of Examples 1 to 9, it also has a relatively low battery strength.

The battery cells of Examples 2 to 9, which use natural graphite and styrene butadiene rubber binder for the negative electrode and include the first and second monomers at an optimized mixing ratio, have excellent capacity characteristics. In particular, the battery cell of Example 4 shows the highest capacity.

As shown in Table 1, a battery using both a polymer electrolyte including the first and second monomers along with a negative electrode including natural graphite and styrene butadiene rubber binder has both high battery strength and high capacity. The combination of high battery strength and high capacity may not be obtainable without the use of both a polymer electrolyte including the first and second monomers along and a negative electrode including natural graphite and styrene butadiene rubber binder.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Therefore, the exemplary embodiments described above are to be understood to be illustrative but not restrictive.

What is claimed is:

1. A rechargeable lithium battery comprising:
a positive electrode comprising a positive active material capable of intercalating and deintercalating lithium;
a negative electrode comprising a carbon-based negative active material and a water-soluble binder; and
a polymer electrolyte comprising a polymer, a non-aqueous organic solvent, and a lithium salt,
the polymer comprising a polymerization product of a first monomer represented by Chemical Formula 1 with a second monomer selected from the group consisting of monomers represented by Chemical Formulae 2 to 7 and combinations thereof;

A-U—B  Chemical Formula 1 wherein U is a moiety of polyesterpolyol,
A and B are each $CH_2=CR-C(=O)-O-CH_2CH_2-NH-C(=O)-$, wherein R is $CH_3$;

$CH_2=CL1-C(=O)-O-M$  Chemical Formula 2

$CH_2=CL1-O-M$  Chemical Formula 3

$CH_2=CL1-O-C(=O)-M$  Chemical Formula 4

$CH_2=CH-CH_2-O-M$  Chemical Formula 5

$CH_2=CH-S(=O)_2-M$  Chemical Formula 6

$CH_2=CL1-C(=O)-O-CH_2CH_2-NH-C(=O)-O-M$  Chemical Formula 7 wherein, L1 is H, a $C_1$ to $C_{10}$ hydrocarbon, or a $C_6$ to $C_{10}$ aromatic hydrocarbon; and M is a $C_1$ to $C_{20}$ hydrocarbon, a $C_1$ to $C_{20}$ halogenated hydrocarbon, a $C_6$ to $C_{20}$ aromatic hydrocarbon, or a $C_6$ to $C_{20}$ halogenated aromatic hydrocarbon, and
wherein a weight ratio of the first monomer to the second monomer ranges from about 75:25 to about 61:39.

2. The rechargeable lithium battery of claim 1, wherein U includes a repeating unit selected from the group consisting of a first repeating unit represented by Chemical Formula 8a, a second repeating unit represented by Chemical Formula 8b, and a third repeating unit represented by Chemical Formula 8c;

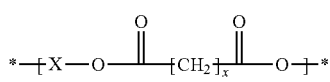

Chemical Formula 8a

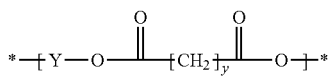

Chemical Formula 8b

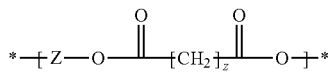

Chemical Formula 8c wherein X, Y, and Z are individually selected from the group consisting of moieties derived from ethyleneglycol, polyethylene glycol, propyleneglycol, polypropylene glycol, diethylene glycol, alkane diols, ethoxylated alkane diols, propoxylated alkane diols, trimethylolpropane, ethoxylated trimethylolpropane, propoxylated trimethylolpropane, ditrimethylolpropane, ethoxylated ditrimethylolpropane, propoxylated ditrimethylolpropane, pentaerythritol, ethoxylated pentaerythritol, propoxylated pentaerythritol, dipentaerythritol, ethoxylated dipentaerythritol, propoxylated dipentaerythritol, bisphenol A, ethoxylated bisphenol A, or propoxylated bisphenol A, and
x, y, and z are individually selected from the group consisting of integers ranging from 1 to 20.

3. The rechargeable lithium battery of claim 1, wherein the second monomer is represented by Chemical Formula 2.

4. The rechargeable lithium battery of claim 1, wherein the carbon-based negative active material is crystalline carbon.

5. The rechargeable lithium battery of claim 1, wherein the carbon-based negative active material is natural graphite.

6. A rechargeable lithium battery comprising:
a positive electrode comprising a positive active material capable of intercalating and deintercalating lithium;
a negative electrode comprising a carbon-based negative active material and a water-soluble binder; and
a polymer electrolyte comprising a polymer, a non-aqueous organic solvent, and a lithium salt,
the polymer comprising a polymerization product of a first monomer represented by Chemical Formula 1 with a second monomer selected from the group consisting of monomers represented by Chemical Formulae 2 to 7 and combinations thereof;

A-U—B  Chemical Formula 1 wherein U is a moiety of polyesterpolyol,
A and B are each $CH_2=CR-C(=O)-O-CH_2CH_2-NH-C(=O)-$, wherein R is $CH_3$;

$CH_2=CL1-C(=O)-O-M$  Chemical Formula 2

$CH_2=CL1-O-M$  Chemical Formula 3

$CH_2=CL1-O-C(=O)-M$  Chemical Formula 4

$CH_2=CH-CH_2-O-M$  Chemical Formula 5

$CH_2=CH-S(=O)_2-M$  Chemical Formula 6

$CH_2=CL1-C(=O)-O-CH_2CH_2-NH-C(=O)-O-M$  Chemical Formula 7 wherein, L1 is H, a $C_1$ to $C_{10}$ hydrocarbon, or a $C_6$ to $C_{10}$ aromatic hydrocarbon; and M is a $C_1$ to $C_{20}$ hydrocarbon, a $C_1$ to $C_{20}$ halogenated hydrocarbon, a $C_6$ to $C_{20}$ aromatic hydrocarbon, or a $C_6$ to $C_{20}$ halogenated aromatic hydrocarbon, and
wherein the water-soluble binder comprises styrene-butadiene rubber, and
wherein a weight ratio of the first monomer to the second monomer is about 75:25 to about 61:39.

* * * * *